United States Patent [19]

Komatsu et al.

[11] Patent Number: 5,347,766
[45] Date of Patent: Sep. 20, 1994

[54] METHOD FOR POLISHING SURFACE OF TRANSPARENT SUBSTRATE LAYER OF COLOR FILTER UNIT

[75] Inventors: Kazuyoshi Komatsu; Osamu Narimatsu; Yasuo Takemura; Yoko Takeuchi, all of Nagoya; Susumu Waki, Tokyo, all of Japan

[73] Assignee: Mitsui Toatsu Chemicals, Inc., Tokyo, Japan

[21] Appl. No.: 923,358

[22] Filed: Jul. 16, 1992

[30] Foreign Application Priority Data

Jul. 18, 1991 [JP] Japan .................. 3-178292

[51] Int. Cl.$^5$ .............................. B24B 1/00
[52] U.S. Cl. .......................... 451/29; 451/38
[58] Field of Search ............. 51/310, 312, 319, 320, 51/321

[56] References Cited

U.S. PATENT DOCUMENTS 4,801,490  1/1989  Schuette .................. 51/310

FOREIGN PATENT DOCUMENTS 0196971  11/1983  Japan ..................... 51/312
0074573   4/1987  Japan ..................... 51/312
0140766   6/1987  Japan ..................... 51/312
278025   11/1988  Japan .
116620    5/1989  Japan .

*Primary Examiner*—M. Rachuba
*Attorney, Agent, or Firm*—Cushman, Darby & Cushman

[57] ABSTRACT

The present invention provides a method for polishing the surface of the transparent substrate layer of a color filter unit comprising a transparent substrate layer, a color filter layer, a protective film layer and a transparent electrode layer, which method comprises attaching, to the surface of the transparent electrode layer, a pressure-sensitive tape consisting of a base film layer and a pressure-sensitive adhesive layer giving substantially no staining to said surface of the transparent electrode layer, formed on one surface of the base film layer, as well as a pressure-sensitive tape used in the method. When the surface of the transparent substrate layer is polished according to the present method, there occurs no breakage of the color filter unit. Further, there occurs no staining of the surface of the transparent electrode layer owing to the adhesion of residual pressure-sensitive adhesive, abrasive, polishing refuse, etc. Consequently, a color filter unit giving a good image clearness can be obtained at high productivity.

5 Claims, 1 Drawing Sheet

METHOD FOR POLISHING SURFACE OF TRANSPARENT SUBSTRATE LAYER OF COLOR FILTER UNIT

BACKGROUND OF THE INVENTION (a) Field of the Invention

The present invention relates to a method for polishing the surface of the transparent substrate layer of a color filter unit used in liquid crystal displays, as well as to a pressure-sensitive tape used in the method.

More particularly, the present invention relates to a method for polishing the surface of the transparent substrate layer of a color filter unit used in color televisions, personal computers, etc., which comprises attaching, to the surface of the transparent electrode layer of the color filter filter unit, a particular pressure-sensitive tape capable of preventing the breakage of the color filter unit during polishing and giving, to said surface of the transparent electrode layer of the color filter unit, substantially no staining caused by adhesion of residual pressure-sensitive adhesive, polishing agent, polishing refuse, etc., as well as to a pressure-sensitive tape used in the method.

(b) Description of the Prior Art

In recent years, various flat displays such as LED, PDP, VFD, EL, ECD, flat CRT, LCD and the like have been developed. With respect to color displays, LCD (liquid crystal display) was put into practical application, one step ahead of other displays. LCD can be relatively easily made into a color type by adding a color filter thereto and can be obtained as a thin and lightweight product. Hence, the role of color filter in LCD is important in aiming at the performance improvement of LCD.

In general, soda-lime glass is used as the transparent substrate layer of color filter unit. This soda-lime glass is produced by, for example, the Colburn process or the float process but has surface unevenness.

When a transparent electrode film is formed on such a substrate by vapor deposition, there arises unevenness in film thickness, whereby the non-uniformity of color or the unevenness in threshold voltage appears, making the image clearness strikingly low.

In order to solve these problems, Japanese Patent Application Kokai (Laid-Open) No. 278025/1988, for example, proposes a method for forming a color filter on a glass (transparent substrate) one or both surfaces of which have been polished to a flatness accuracy of 0.15 mm or less.

In this method, however, it is impossible to prevent the reduction in image clearness which is caused by, for example, the scars appearing on the surfaces of the transparent substrate during the transportation, storage, assembling, etc. or the staining of the surface side of said substrate on which no color filter is formed.

Further, Japanese Patent Application Kokai (Laid-Open) No. 116620/1989 proposes a method which comprises forming a color filter layer on a light-transmitting substrate (a transparent substrate), coating a resin thereon to form a resin layer, polishing the resin layer to make it flat, and then forming thereon a tin-containing indium oxide transparent conductive film, i.e. a transparent electrode (ITO).

In this method, however, there are various problems. For example, in polishing the resin layer, scars are formed on the light-transmitting substrate or the color filter layer or there occurs their breakage, in come cases; the polishing refuse, polishing agent, etc. adhere to the color filter layer, increasing the loss in light amount or making non-uniform the spectral transmittance.

In these methods, one or both surfaces of a transparent substrate on which a color filter is formed, is polished to a high flatness accuracy, or a resin layer on which ITO is formed, is made flat; in these methods, therefore, there cannot be expected the prevention of the scars or stains appearing on the surface(s) of the transparent substrate in forming thereon a color filter layer or a transparent electrode layer.

Hence, there was adopted a method which comprises forming, on a transparent substrate, a color filter layer, a protective film layer and a transparent electrode layer in this order to produce a color filter unit, then coating, for a protective purpose, a resist ink, a paraffin or the like on the transparent electrode layer of the color filter unit, followed by drying, and polishing the surface of the transparent substrate of the color filter unit.

This method, however, is not preferable because, after the coating, drying and solidification of resist ink, paraffin or the like and subsequent polishing of the transparent substrate, the resist ink, paraffin or the like must be removed by washing with an organic solvent or the like under heating, which makes the polishing procedure complex, and further the incomplete removal of resist ink, paraffin or the like invites the staining of the surface of the transparent electrode layer.

Thus, it is strongly desired to develop a method for polishing the surface of the transparent substrate layer of a color filter unit, which method is free from the above-mentioned problems.

OBJECTS AND SUMMARY OF THE INVENTION

The objects of the present invention lies in solving the above-mentioned problems and providing (a) a method for polishing the surface of the transparent substrate layer of a color filter unit to remove the scars, etc. appearing on said surface of the transparent substrate layer during the steps of formation of the color filter unit, which method gives neither breakage nor staining to the color filter unit and is conducted in a simple procedure at high productivity, and (b) a pressure-sensitive tape used in the method.

The present inventors made study in order to achieve the above objects and, as a result, found that the above objects can be met by attaching a particular pressure-sensitive tape to the surface of the transparent electrode layer of a color filter unit comprising a transparent substrate layer, a color filter layer, a protective film layer and a transparent electrode layer.

According to the first aspect of the present invention, there is provided a method for polishing the surface of the transparent substrate layer of a color filter unit comprising a transparent substrate layer, a color filter layer, a protective film layer and a transparent electrode layer, which method comprises attaching, to the surface of the transparent electrode layer, a pressure-sensitive tape consisting of a base film layer selected from a single-layer film or a double-layer film and a pressure-sensitive adhesive layer giving substantially no staining to said surface of the transparent electrode layer, formed on one surface of the base film layer, so that the pressure-sensitive adhesive layer of the pressure-sensitive tape contacts with said surface of the transparent electrode layer.

According to the second aspect of the present invention, there is provided a pressure-sensitive tape comprising a base film layer selected from a single-layer film or a multi-layer film and a pressure-sensitive adhesive layer formed on one surface of the base film layer, which is used in polishing the surface of the transparent substrate layer of a color filter unit comprising a transparent substrate layer, a color filter layer, a protective film layer and a transparent electrode layer, by attaching the pressure-sensitive adhesive layer of the pressure-sensitive tape to the surface of the transparent electrode layer of the color filter unit and wherein the pressure-sensitive adhesive layer gives substantially no staining to said surface of the transparent electrode layer.

According to the present invention, in polishing the surface of the transparent substrate layer of a color filter unit, there occurs neither breakage nor damage of the color filter unit. Further, there occurs no staining of the surface of the transparent electrode layer owing to the adhesion of residual pressure-sensitive adhesive, polishing agent, polishing refuse, etc. to said surface.

DETAILED DESCRIPTION OF THE INVENTION

Figure 1:
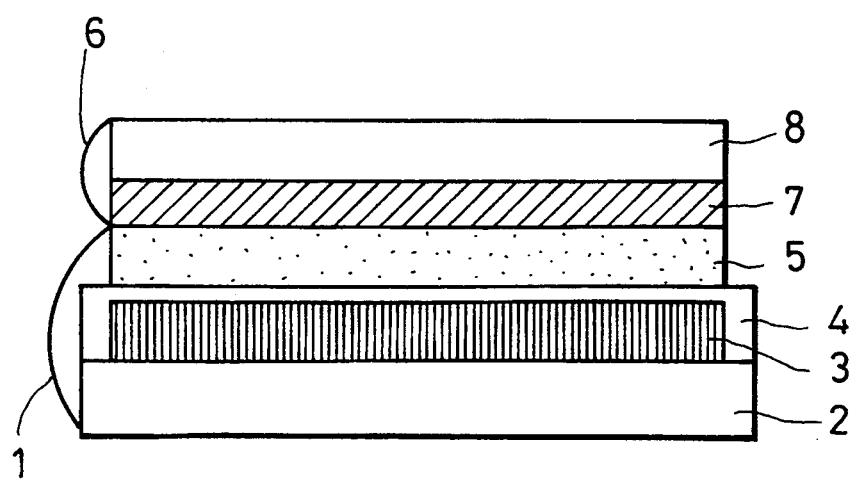
FIG. 1 is an example of the sectional view showing a state wherein a pressure-sensitive adhesive tape has been attached onto the surface of the transparent electrode layer of a color filter unit.

The pressure-sensitive tape of the present invention is obtained by coating a particular pressure-sensitive adhesive on one side of a base film, followed by drying, to form a pressure-sensitive adhesive layer on the base film layer. The pressure-sensitive adhesive layer gives substantially no staining to the surface of the transparent electrode layer of a color filter unit when the pressure-sensitive adhesive layer is attached to said surface and the surface of the transparent substrate layer of the color filter unit is polished.

The base film layer used in the pressure-sensitive tape of the present invention, may be a single-layer film or a multi-layer film. As the material for the base film layer, there can be mentioned an ethylene-vinyl acetate copolymer film, a polyethylene terephthalate film, a polyethylene film, a polypropylene film, a polyvinyl chloride film, etc.

When the base film layer is a single-layer film, the film is preferably has a hardness (Shore D) of 80 or less. When the base film layer is a multi-layer film, the side of the film on which the pressure-sensitive adhesive layer is formed, preferably has a hardness (Shore D) of 80 or less.

When the single-layer film or the side of the multi-layer film on which the pressure-sensitive adhesive layer is formed, has a hardness (Shore D) higher than 80, the stress which the color filter unit undergoes at the time of polishing of the surface of the transparent substrate layer, is not sufficiently absorbed by the tape, inviting the breakage or damage of the color filter unit during the polishing, in some cases.

The Shore D hardness used in the present invention is a value measured according to the method specified by ASTM D 2240.

The thickness of the base film is appropriately determined depending upon the shape and surface condition of the transparent electrode layer of color filter unit to be protected, the method and conditions for polishing the transparent substrate layer of color filter unit, and the workability (e.g. cuttability, attachability) of the pressure-sensitive tape. The preferable thickness is ordinarily 10–2,000 $\mu$m.

The base film is preferably subjected to a corona discharge treatment at the surface on which the pressure-sensitive adhesive layer is formed, in order to improve the anchor effect between base film and pressure-sensitive adhesive.

The pressure-sensitive adhesive layer of the pressure-sensitive tape of the present invention consists of a pressure-sensitive adhesive which has an appropriate adhesion strength capable of preventing the peeling of the tape from the surface of the transparent electrode layer of the color filter unit during the polishing of the transparent substrate layer of the color filter unit and which gives substantially no staining to the surface of the transparent electrode layer.

The adhesion strength is appropriately determined depending upon the shape and surface condition of the transparent electrode layer of color filter unit to be protected, the method and conditions for polishing the transparent substrate layer of color filter unit, the workability (e.g. cuttability, attachability) of the pressure-sensitive tape, etc. The adhesion strength is ordinarily 5–800 g/25 mm.

The pressure-sensitive adhesive layer giving substantially no staining to the surface of the transparent electrode layer is a pressure-sensitive adhesive layer selected from the following evaluation method.

The pressure-sensitive adhesive layer of a pressure-sensitive tape is attached to the foreign-matter-free surface of the transparent electrode layer of a color filter unit. The tape-attached color filter unit is allowed to stand for 24 hours in an atmosphere controlled to a temperature of 23° C.±2° C. and a relative humidity of 50%±5%. Then, the tape is peeled from the surface of the transparent electrode layer, and the surface of the transparent electrode layer is subjected to a survey scan spectrum method of ESCA to measure integrals of wavelength intensities of individual elements present on said surface. The measurement conditions for ESCA are shown below. A linear method is used for the background elimination in obtaining the integrals of wavelength intensities of individual elements.

Apparatus: ESCALAB MK II manufactured by VG-Scientific Co. (hereinafter abbreviated to VG Co.)
X-rays source: Mg K$\alpha$ line
X-rays output: 300 W
Vacuum used: $5 \times 10^{-9}$ millibar or less When in the above measurement, the pressure-sensitive adhesive layer gives ratios of integrals of carbon (C), potassium (K), sodium (Na) and chlorine (Cl) wavelength intensities to integral of indium wavelength intensity, of 0.1 or less (C/In), 0.03 or less (K/In), 0.03 or less (Na/In) and 0.03 or less (Cl/In), respectively (said ratios are hereinafter referred to as degree of staining), the adhesive layer is regarded to be a pressure-sensitive adhesive layer giving substantially no staining to the surface of the transparent electrode layer.

When elements such as K, Na, Cl and the like adhere to the surface of the transparent electrode layer and the degree of staining by any of these elements exceeds 0.03, the transparent electrode layer is in a stained or corroded state, causing disconnection, etc., and is unable to exhibit a function as a liquid crystal display.

When the degree of staining by C exceeds 0.1, the spectral transmittance of the transparent electrode is low, reducing the clearness of image.

ESCA measures the proportions of elements present in a certain area. The surface of a transparent electrode layer which is sufficiently clear, consists of three elements, i.e. indium (In), tin (Sn) and oxygen (O), and these elements are distributed in given proportions. If contaminants, for example, C, K, Na, Cl, etc. enter thereinto from outside, the proportions of In, Sn and O decrease relatively. Herein, In is selected as a representative element of In, Sn and O, and the degree of staining is expressed by C/In, K/In, Na/In and Cl/In.

Under a sufficiently clear state, C=0, K=0, Na=and Cl=0; consequently, the degree of staining is C/In=0, K/In=0, Na/In=0 and Cl/In=0. As C, K, Na and Cl get larger (In gets smaller relatively), C/In, K/In, Na/In and Cl/In become larger. That is, when C/In, K/In, Na/In and Cl/In are larger, the degree of staining is higher. In the present invention, there is preferred a pressure-sensitive adhesive capable of forming a pressure-sensitive adhesive layer which gives small C/In, K/In, Na/In and Cl/In.

The pressure-sensitive adhesive used in the present invention can be of any type as long as it can form a pressure-sensitive adhesive layer satisfying the above requirement, but is preferably an acrylic resin type pressure-sensitive adhesive. The acrylic resin type pressure-sensitive adhesive can be exemplified by pressure-sensitive adhesives obtained by copolmerizing an acrylic acid ester monomer having an alkyl group of from 1 to 18 carbon atoms, with at least one monomer selected from acrylic acid, methacrylic acid and esters thereof having an alkyl group of from 1 to 18 carbon atoms. Out of these pressure-sensitive adhesives is selected a pressure-sensitive adhesive capable of foxing a pressure-sensitive adhesive layer which passes the above test for degree of staining, specified by the present invention.

The pressure-sensitive adhesive used in the present invention may contain a crosslinking agent, a surfactant, an organic solvent, etc. as long as the objects of the present invention are not impaired.

The thickness of the pressure-sensitive adhesive layer formed on the base film layer is appropriately determined depending upon the shape and surface condition of transparent electrode layer, etc. but is preferably 2-200 µm ordinarily.

In order to form the pressure-sensitive adhesive layer on the base film layer, it is preferable to coat the pressure-sensitive adhesive on one surface of the base film. The pressure-sensitive adhesive can be coated on the part or whole area of one surface of the base film by a known coating method such as roll coating, dipping, brush coating, spray coating or the like.

The pressure-sensitive tape of the present invention is transported or stored ordinarily by attaching a release film on the surface of the pressure-sensitive adhesive layer and making the resulting material into a roll or cutting the material into sheets of given size to form a laminate of these sheets. The release film is preferably a polypropylene film of good releasability, particularly preferably a biaxially stretched polypropylene film having good attachability and releasability.

Next, description is made on the method for polishing the surface of the transparent substrate layer of a color filter unit according to the present invention.

FIG. 1 is a sectional view showing a state wherein a pressure-sensitive tape has been attached to the surface of the transparent electrode layer of a typical color filter unit. In FIG. 1, 1 is a color filter unit; 2 is a transparent substrate layer; 3 is a color filter layer; 4 is a protective film layer; 5 is a transparent electrode (ITO electrode) layer; 6 is a pressure-sensitive tape; 7 is a pressure-sensitive adhesive layer; and 8 is a base film layer.

There is no particular restriction as to the process for producing a color filter unit to which the present polishing method is applicable. A tlrpical production process for color filter unit is described below. That is, gelatin containing a dichromate as a photosensitizer is coated, by spin coating or the like, on the surface of a transparent substrate layer 2 consisting of, for example, a transparent glass composed mainly of soda-lime glass, so as to give a film thickness of about 1 µm; a light is applied through a mask of given shape, followed by development; then, dyeing is conducted using an acid dye or the like to form the first color portion (red) in a color filter layer 3; thereafter, a protective film layer 4 is formed as an intermediate layer for prevention of staining, using an acrylic resin or the like; similar operations are conducted to form green and blue color portions in the color filter layers 3; a transparent electrode layer 5 is formed on the protective film layer 4, whereby a color filter unit 1 is formed.

The polishing method of the present invention is characterized by attaching, at the time of polishing the transparent substrate layer 2 of a color filter unit 1, a pressure-sensitive tape 6 having a particular pressure-sensitive adhesive layer such as mentioned above, to the surface of the transparent electrode layer 5 of the color filter unit 1. Therefore, the present method poses no restriction on the polishing itself of the transparent substrate layer 2.

An example of the method for polishing the surface of the transparent substrate layer 2 according to the present invention is described below.

A pressure-sensitive tape 6 from which the release film has been removed is cut into an appropriate size so as to match the shape of the transparent electrode layer 5 of a color filter unit 1. The cut tape 6 is attached to the surface of the transparent electrode layer 5 so that the pressure-sensitive adhesive layer 7 of the tape 6 contacts with the transparent electrode layer 5, and the tape 6 is trimmed mechanically or manually so as to precisely meet the shape of the transparent electrode layer 5. Then, the surface of the transparent substrate layer 2 of the color filter unit 1 is sandblasted with, for example, aluminum oxide having an average particle diameter of about 18 µm, after which the surface is polished using, for example, an abrasive (obtained by adding 10 g of cerium oxide of 10 µm in average particle diameter to 100 ml of water), a foamed polyurethane pad and an Oscar type polishing machine. This polishing is continued until the scars, stains, etc. present on the surface of the transparent substrate layer 2 are removed completely. The preferable amount of polishing is about 1 µm generally.

During the polishing, the color filter unit 1 undergoes neither breakage nor damage because the pressure-sensitive tape 6 attached to the surface of the transparent electrode layer 5 absorbs the stress applied to the color filter unit 1 during the polishing. Further, the attaching of the tape 6 can prevent the adhesion of foreign matter such as abrasive, polishing refuse and the like, to the surface of the transparent electrode layer 5.

After the completion of the polishing, the foreign matter such as abrasive, polishing refuse and the like adhering to the polished surface of the transparent substrate layer 2 is removed by washing with pure water. Then, the pressure-sensitive tape 6 is peeled from the surface of the transparent electrode layer 5, after which the surface of the transparent electrode layer 5 is washed with pure water and dried.

Thus, by polishing the transparent substrate layer according to the method of the present invention, the transparent electrode layer has no residual pressure-sensitive adhesive and the color filter unit undergoes neither breakage nor damage. As a result, simple washing after the polishing can give a color filter unit of good image clearness.

The present invention is hereinafter described in further detail by way of Examples. In the Examples, evaluations of properties, etc. were made by the following methods.

(1) Hardness (Shore D)

Was measured in accordance with the method specified by ASTM D 2240.

(2) Degree of staining

A pressure-sensitive tape was attached to the foreign-matter-free surface of the transparent electrode layer of a color filter unit. The tape and the color filter unit were allowed to stand for 24 hours in an atmosphere controlled to a temperature of 23° C.±2° C. and a relative humidity of 50%±5%. Then, the pressure-sensitive tape was peeled from the surface of the transparent electrode layer, after which the surface was subjected to ESCA using LAB MK II manufactured by VG Co. under the conditions of X-rays source=Mg Ks line, X-rays output=300 W and vacuum adopted=$5 \times 10^{-9}$ millibar or less, to measure elements present on said surface. Using the survey scan spectrum obtained, there were determined ratios of integrals of C, K, Na and Cl wavelength intensities to integral of In wavelength intensity, i.e., C/In, K/In, Na/In and Cl/In, and these ratios were taken as degree of staining.

(3) Breakage (%)

One hundred 10-inch color filter units were polished using an Oscar type polishing machine. The number of the color filter units broken during the polishing was taken as breakage (%).

(4) Number of adhering foreign matter

A pressure-sensitive tape was attached to the surface of the transparent electrode layer of a color filter unit, and the surface of the transparent substrate layer of the color filter unit was polished using an Oscar type polishing machine. The tape was peeled and the color filter unit was washed with pure water and dried. The surface of the transparent electrode layer was observed using an optical microscope (magnification=400) to measure the number of foreign matter of 10 μm or more in size, present on the surface. The measured number was converted to number of foreign matter per 100 cm² and expressed as "number of adhering foreign matter".

(5) Corrosion

The same polishing and washing as in the above (4) were conducted. The resulting color filter unit was allowed to stand for 10 days in an atmosphere of 60° C. and 75% relative humidity. Thereafter, the pressure-sensitive tape was peeled, after which the surface of the transparent electrode layer was observed using an optical microscope (magnification=400) to examine the corroded state of the electrode. A case wherein corrosion was seen, was expressed as "present", and a case wherein no corrosion was seen, was expressed as "absent".

(6) Clearness of image

The same polishing and washing as in the above (4) were conducted. Then, the resulting color filter unit was measured for the spectral transmittance of the red color filter, which was taken as clearness of image. An average spectral transmittance at 600–700 nm, of 80% or more was expressed as clearness of image=good; an average spectral transmittance at the same wavelength, of 70% to less than 80% was expressed as clearness of image=slightly poor; and an average spectral transmittance at the same wavelength, of less than 70% was expressed as clearness of image=poor.

EXAMPLE 1

An ethylene-vinyl acetate copolymer (hereinafter referred to as EVA) was subjected to T-die extrusion to obtain an EVA film of 140 μm in thickness, as a base film layer for pressure-sensitive tape.

One surface of the EVA film was subjected to a corona discharge treatment. Then, said surface was coated with an acrylic resin type pressure-sensitive adhesive [Structbond X-5078 (trade name) manufactured by Mitsui Toatsu Chemicals, Inc.] using a roll coater, and dried at 90° C. to form an acrylic resin type pressure-sensitive adhesive layer of about 20 μm in thickness, on the surface to obtain a pressure-sensitive tape.

The pressure-sensitive adhesive layer of the pressure-sensitive tape was measured for degree of staining. The results were C/In=0.03, K/In=0.01, Na/In=0.01 and Cl/In=0.01.

The pressure-sensitive tape was attached to the surface of the transparent electrode layer of a color filter unit of 450 mm in length and 300 mm in width, comprising a transparent substrate layer, a color filter layer, a protective film layer and a transparent electrode layer. The tape-attached color filter unit was allowed at room temperature for about 24 hours. Then, the surface of the transparent substrate layer was polished using an abrasive (obtained by adding 10 g of cerium chloride of 10 μm in average particle diameter, to 100 ml of water), a foamed polyurethane pad and an Oscar type polishing machine. The polishing time was 3 minutes and the polishing amount was about 1 μm.

After the completion of the polishing, the polished surface was washed with pure water to remove the abrasive, etc. adhering thereto. Then, the pressure-sensitive tape was peeled from the surface of the transparent electrode layer, and said surface was dipped in pure water and washed at room temperature for 2 minutes using an ultrasonic wave.

The same test was conducted for 100 color filter units, and the number of the color filter units which underwent damage or breakage as a result of the polishing of the transparent substrate layer, was expressed as breakage (%).

Further, the evaluation tests for clearness of image, corrosion and number of adhering foreign matter were conducted according to the methods mentioned earlier. All the results obtained are summarized in Table 1.

EXAMPLE 2

Tests were conducted in the same manners as in Example 1 except that as the base film layer of the pressure-sensitive tape there was used a polyethylene terephthalate resin (hereinafter referred to as PET) film of 60 μm in thickness, obtained by T-die extrusion. The results obtained are shown in Table 1.

EXAMPLE 3

Tests were conducted in the same manners as in Example 1 except that as the base film layer of the pressure-sensitive tape there was used a polyvinyl chloride (hereinafter referred to as PVC) film of 110 μm in thickness, obtained by T-die extrusion. The results obtained are shown in Table 1.

EXAMPLE 4

Tests were conducted in the same manners as in Example 1 except that as the base film layer of the pressure-sensitive tape there was used a polyethylene resin (hereinafter referred to as PE) film of 60 μm in thickness, obtained by T-die extrusion. The results obtained are shown in Table 1.

EXAMPLE 5

Tests were conducted in the same manners as in Example 1 except that as the base film layer of the pressure-sensitive tape there was used a polypropylene resin (hereinafter referred to as PP) film of 60 μm in thickness, obtained by T-die extrusion. The results obtained are shown in Table 1.

EXAMPLE 6

Tests were conducted in the same manners as in Example 1 except that as the pressure-sensitive adhesive layer of the pressure-sensitive tape there was used an acrylic resin type pressure-sensitive adhesive [MT-TACK 5216 ER (trade name) manufactured by Mitsui Toatsu Chemicals, Inc.] having a degree of staining of C/In=0.06, K/In=0.01, Na/In=0.01 and Cl/In=0.01. The results obtained are shown in Table 1.

EXAMPLE 7

Tests were conducted in the same manners as in Example 1 except that as the pressure-sensitive adhesive layer of the pressure-sensitive tape there was used an acrylic resin type pressure-sensitive adhesive [MT-TACK 5366 ER (trade name) manufactured by Mitsui Toatsu Chemicals, Inc.] having a degree of staining of C/In=0.09, K/In=0.01, Na/In=0.01 and Cl/In=0.01. The results obtained are shown in Table 1.

EXAMPLE 8

Tests were conducted in the same manners as in Example 1 except that as the pressure-sensitive adhesive layer of the pressure-sensitive tape there was used an acrylic resin type pressure-sensitive adhesive [MT-TACK 5268 ER (trade name) manufactured by Mitsui Toatsu Chemicals, Inc.] having a degree of staining of C/In=0.09, K/In=0.02, Na/In=0.02 and Cl/In=0.02. The results obtained are shown in Table 1.

EXAMPLE 9

Tests were conducted in the same manners as in Example 1 except that there was used a pressure-sensitive tape obtained as follows. An EVA film of 70 μm in thickness obtained by T-die extrusion was laminated with a polyimide film of 20 μm in thickness obtained by T-die extrusion, using an acrylic resin type adhesive [Structbond X-5060 (trade name) manufactured by Mitsui Toatsu Chemicals, Inc.] to prepare a base film layer; one surface (the EVA film side) of the base film layer was subjected to a corona discharge treatment; and on this surface was formed a pressure-sensitive adhesive layer in the same manner as in Example 1. The results obtained are shown in Table 1.

COMPARATIVE EXAMPLE 1

Tests were conducted in the same manners as in Example 1 except that no pressure-sensitive tape was used. The results obtained are shown in Table 2.

COMPARATIVE EXAMPLE 2

Tests were conducted in the same manners as in Example 1 except that there was used a pressure-sensitive tape using, as the base film layer, a polyimide (hereinafter referred to as PI) film of 40 μm in thickness obtained by T-die extrusion. The results obtained are shown in Table 2.

COMPARATIVE EXAMPLE 3

Tests were conducted in the same manners as in Example 1 except that as the pressure-sensitive adhesive layer of the pressure-sensitive tape there was used an acrylic resin type pressure-sensitive adhesive [MT-TACK 5367 ER (trade name) manufactured by Mitsui Toatsu Chemicals, Inc.] having a degree of staining of C/In=0.12, K/In=0.02, Na/In=0.02 and Cl/In=0.02. The results obtained are shown in Table 2.

COMPARATIVE EXAMPLE 4

Tests were conducted in the same manners as in Example 1 except that as the pressure-sensitive adhesive layer of the pressure-sensitive tape there was used an acrylic resin type pressure-sensitive adhesive [MT-TACK 5232 ER (trade name) manufactured by Mitsui Toatsu Chemicals, Inc.] having a degree of staining of C/In=0.06, K/In=0.05, Na/In=0.02 and Cl/In=0.02. The results obtained are shown in Table 2.

COMPARATIVE EXAMPLE 5

Tests were conducted in the same manners as in Example 1 except that as the pressure-sensitive adhesive layer of the pressure-sensitive tape there was used an acrylic resin type pressure-sensitive adhesive [MT-TACK 5267 ER (trade name) manufactured by Mitsui Toatsu Chemicals, Inc.] having a degree of staining of C/In=0.06, K/In=0.02, Na/In=0.06 and Cl/In=0.02. The results obtained are shown in Table 2.

COMPARATIVE EXAMPLE 6

Tests were conducted in the same manners as in Example 1 except that as the pressure-sensitive adhesive layer of the pressure-sensitive tape there was used an acrylic resin type pressure-sensitive adhesive [Structbond X-5060 (trade name) manufactured by Mitsui Toatsu Chemicals, Inc.] having a degree of staining of C/In=0.06, K/In=0.02, Na/In=0.02 and Cl/In=0.08. The results obtained are shown in Table 2.

COMPARATIVE EXAMPLE 7

A resist ink [OMR-83 (trade name) manufactured by Tokyo Ooka Kogyo Co., Ltd.] of about 50° C. was coated on the surface of the transparent electrode layer of the same type color filter unit as used in Example 1, using a spin coater [D-SPIN 636 manufactured by Dainippon Screen Mfg. Co., Ltd.]. After about two hours of cooling, a resist film of about 10 μm in thickness was formed on said surface. Then, the transparent substrate layer of the color filter unit was polished in the same manner as in Example 1.

After the polishing, the resist ink was removed by washing with trichloroethylene of about 50° C., followed by washing with pure water. Thereafter, evaluation tests were conducted in the same manners as in Example 1. The results obtained are shown in Table 2.

The time required for the coating and removal of the resist ink was about 4 hours, reducing workability significantly as compared with the cases each using a pressure-sensitive tape. Moreover, a large number of foreign matter (which seemed to be unremoved ink) was present on the surface of the transparent electrode layer.

According to the present method, in polishing the surface of the transparent substrate layer of a color filter unit, there occurs neither breakage nor damage of the color filter unit. Further, there is no staining of the surface of the transparent electrode layer of the color filter unit owing to the adhesion thereto of residual pressure-sensitive adhesive, abrasive, polishing refuse, etc. Consequently, there can be obtained, at good productivity, a color filter unit which is free from color non-uniformity, unevenness in threshold voltage, etc. and which gives an image of high clearness.

TABLE 1

| | Example | | | | | | | | |
|---|---|---|---|---|---|---|---|---|---|
| | 1 | 2 | 3 | 4 | 5 | 6 | 7 | 8 | 9 |
| Base film | | | | | | | | | |
| Composition | EVA | PET | PVC | PE | PP | EVA | EVA | EVA | EVA/PI |
| Thickness ($\mu$m) | 140 | 60 | 110 | 60 | 60 | 140 | 140 | 140 | 70/20 |
| Hardness (Shore D) | 35 | 75 | 32 | 51 | 67 | 35 | 35 | 35 | 35/90 |
| Degree of staining | | | | | | | | | |
| C/In | 0.03 | 0.03 | 0.03 | 0.03 | 0.03 | 0.06 | 0.09 | 0.09 | 0.03 |
| K/In | 0.01 | 0.01 | 0.01 | 0.01 | 0.01 | 0.01 | 0.01 | 0.02 | 0.01 |
| Na/In | 0.01 | 0.01 | 0.01 | 0.01 | 0.01 | 0.01 | 0.01 | 0.02 | 0.01 |
| Cl/In | 0.01 | 0.01 | 0.01 | 0.01 | 0.01 | 0.01 | 0.01 | 0.02 | 0.01 |
| Breakage (%) | 0 | 0 | 0 | 0 | 0 | 0 | 0 | 0 | 0 |
| Corrosion | Absent | Absent | Absent | Absent | Absent | Absent | Absent | Absent | Absent |
| Number of adhering foreign matter | 1 | 1 | 3 | 2 | 2 | 6 | 8 | 2 | 2 |
| Clearness of image | Good | Good | Good | Good | Good | Good | Good | Good | Good |

TABLE 2

| | Comparative Example | | | | | | |
|---|---|---|---|---|---|---|---|
| | 1 | 2 | 3 | 4 | 5 | 6 | 7 |
| Base film | | | | | | | |
| Composition | — | PI | EVA | EVA | EVA | EVA | *1 |
| Thickness ($\mu$m) | — | 40 | 140 | 140 | 140 | 140 | — |
| Hardness (Shore D) | — | 90 | 35 | 35 | 35 | 35 | — |
| Degree of staining | | | | | | | |
| C/In | — | 0.03 | 0.12 | 0.06 | 0.06 | 0.06 | 0.15 |
| K/In | — | 0.01 | 0.02 | 0.05 | 0.02 | 0.02 | 0.01 |
| Na/In | — | 0.01 | 0.02 | 0.02 | 0.06 | 0.02 | 0.01 |
| Cl/In | — | 0.01 | 0.02 | 0.02 | 0.02 | 0.08 | 0.01 |
| Breakage (%) | 35 | 15 | 0 | 0 | 0 | 0 | 12 |
| Corrosion | Absent | Absent | Absent | Present | Present | Present | Absent |
| Number of adhering foreign matter | 160 | 1 | 130 | 12 | 16 | 31 | 330 |
| Clearness of image | Poor | Poor | Poor | Poor | Poor | Poor | Slightly poor |

We claim:

1. A method for polishing a surface of a transparent substrate layer of a color filter unit comprising a transparent substrate layer, a color filter layer, a protective film layer and a transparent electrode layer, which method comprises attaching, to a surface of the transparent electrode layer, a pressure-sensitive tape consisting of a base film layer selected from a single layer film or a multi-layer film and a pressure-sensitive adhesive layer which gives substantially no staining to the surface of the transparent electrode layer, and polishing the surface of the transparent substrate layer of the color filter unit.

2. A method according to claim 1, wherein the pressure-sensitive adhesive layer which gives substantially no staining to the surface of the transparent electrode layer results in ratios of integral of carbon (C), potassium (K), sodium (Na) and chlorine (Cl) wavelength intensities to an integral of indium (In) wavelength intensity equal to 0.1 or less (C/In), 0.03 or less (K/In), 0.03 or less (Ka/In) and 0.03 or less (Cl/In), these ratios being obtained by analysis to the survey scan spectrum method of ESCA (electron spectroscopy for chemical analysis) of the surface of the transparent electrode layer after a treatment that comprises the steps of: attaching the pressure-sensitive adhesive layer to the surface of the transparent electrode layer, the surface of the transparent electrode layer being free of foreign matter; letting stand for 24 hours in an atmosphere controlled to a temperature of 23° C. ±2° C. and a relative humidity of 50% ±5%; and peeling the pressure-sensitive adhesive layer from the surface of the transparent electrode layer.

3. A method according to claim 2, wherein the pressure-sensitive adhesive layer comprises acrylic resin type adhesive.

4. A method according to claim 1, wherein the base film layer formed the pressure-sensitive adhesive layer has a hardness (Shore D) of 80 or less.

5. A method according to claim 4, wherein the base film layer comprises an ethylene-vinyl acetate copolymer film, a polyethylene terephthalate film, a polyvinyl chloride film, a polyethylene film or a polypropylele film.

* * * * *